United States Patent
Welborn et al.

[11] Patent Number: 5,600,195
[45] Date of Patent: Feb. 4, 1997

[54] FLYWHEEL ROTOR ASSEMBLY WITH STARTER PAWLS

[75] Inventors: Lynn C. Welborn, King Mountain; Parks W. Stiles; José I. Venegas, both of Gastonia, all of N.C.

[73] Assignee: Homelite, Inc., Charlotte, N.C.

[21] Appl. No.: 149,542

[22] Filed: Nov. 9, 1993

[51] Int. Cl.[6] .................................................... H02K 21/22
[52] U.S. Cl. ......................... 310/153; 310/74; 74/575; 123/149 D
[58] Field of Search ............................... 310/153, 42, 62, 310/63, 74, 80

[56] References Cited

U.S. PATENT DOCUMENTS

| | | | |
|---|---|---|---|
| 2,750,185 | 6/1956 | Moore | 267/1 |
| 3,030,783 | 4/1962 | Schmidt | 64/15 |
| 3,252,452 | 5/1966 | Burkett et al. | 123/185 |
| 3,570,464 | 3/1971 | Morabit | 123/185 |
| 3,634,920 | 1/1972 | Maguire | 29/208 F |
| 3,750,256 | 8/1973 | Elmer | 29/208 B |
| 4,603,664 | 8/1986 | Jackson | 123/149 D |
| 4,674,146 | 6/1987 | Tuggle et al. | 15/330 |
| 4,709,669 | 12/1987 | Wissmann et al. | 123/149 D |
| 4,887,341 | 12/1989 | Sakimori et al. | 29/156.4 |
| 4,959,897 | 10/1990 | Ogawa et al. | 29/227 |
| 4,970,998 | 11/1990 | Tyler | 123/185 |
| 4,980,592 | 12/1990 | Olmr et al. | 310/153 |
| 5,063,812 | 11/1991 | Mercier | 74/575 |
| 5,064,393 | 11/1991 | Inoue | 440/77 |

FOREIGN PATENT DOCUMENTS

| | | |
|---|---|---|
| 605606 | 11/1934 | Germany . |
| 62-297550 | 12/1987 | Japan . |
| 3-60934 | 3/1991 | Japan . |
| 4-189431 | 7/1992 | Japan . |

Primary Examiner—Thomas M. Dougherty
Assistant Examiner—Elvin G. Enad
Attorney, Agent, or Firm—Perman & Green

[57] ABSTRACT

A rotor assembly comprising a rotor, starter pawls, and springs. The rotor has a permanent magnet and starter pawl mounting posts. The starter pawls are movably mounted on the posts. The springs are mounted on the posts biasing the starter pawls in first positions. The springs each have a middle section with a retaining section that engages the exterior of the post and hold the spring on the post during assembly of the rotor assembly.

14 Claims, 12 Drawing Sheets

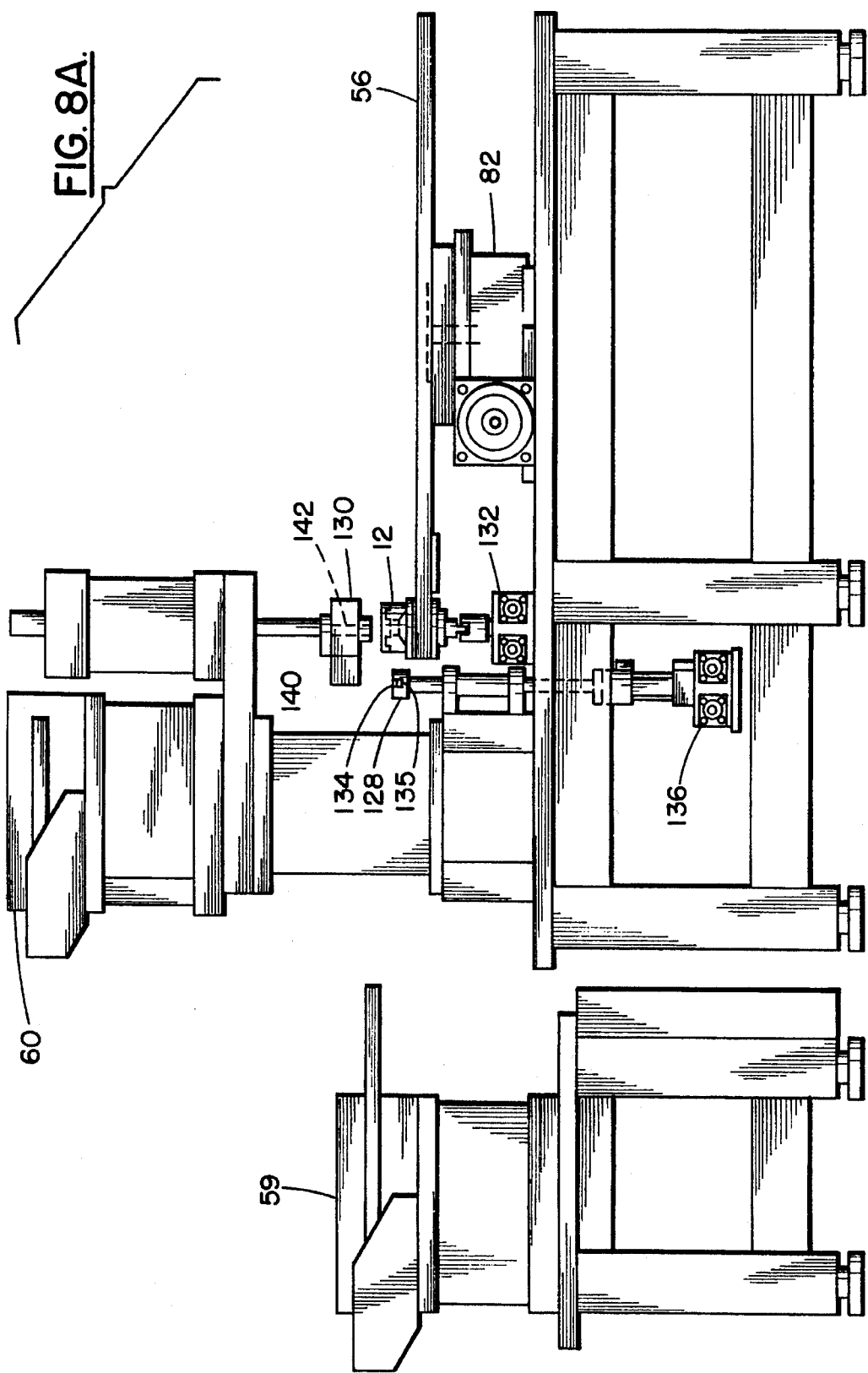

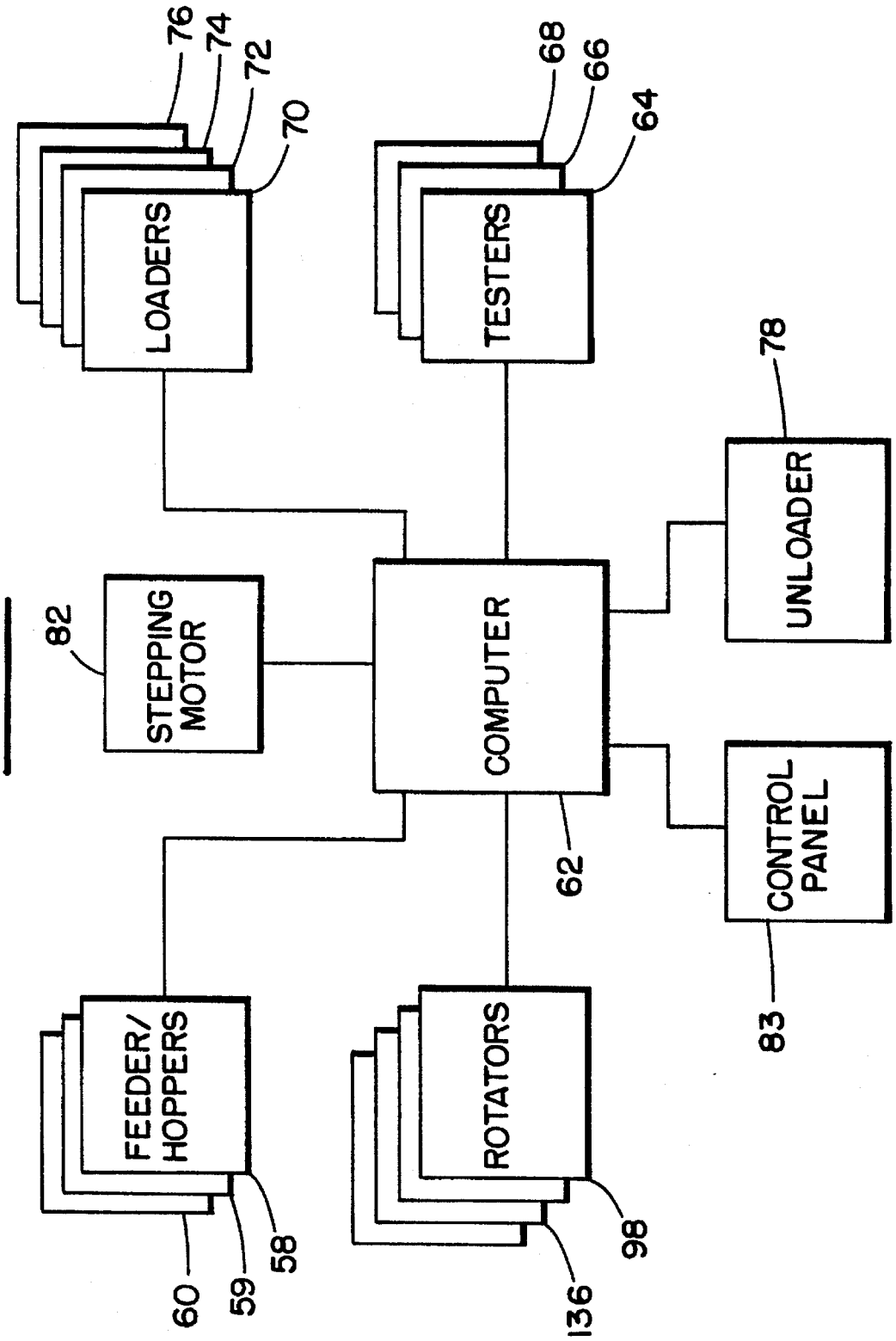

FLYWHEEL ROTOR ASSEMBLY WITH STARTER PAWLS

BACKGROUND OF THE INVENTION

1. Field of the Invention

The present invention relates to flywheel rotor assemblies and, more particularly, to an improved spring for rotor assemblies having starter pawls.

2. Prior Art

Flywheel rotors have been used for a number of years in internal combustion engines. One example of a flywheel rotor can be seen in U.S. Pat. No. 4,980,592. Another type of flywheel rotor assembly known in the prior art has spring biased starter pawls that are used to start the engine. One example of a flywheel rotor assembly having starter pawls can be seen in U.S. Pat. No. 4,674,146. One type of spring used to bias such starter pawls includes a first end positioned against a cooling fin of the rotor, a middle coiled section, and a second end that has a curved section that is hooked onto the starter pawl.

SUMMARY OF THE INVENTION

In accordance with one embodiment of the invention a rotor assembly is provided comprising a rotor, starter pawls, and springs. The rotor has a permanent magnet and starter pawl mounting posts. The starter pawls are movably mounted on the posts. The springs are mounted on the posts biasing the starter pawls in first positions. The springs each have a first end mounted on one of the starter pawls, an opposite second end positioned against a portion of the rotor, and middle section having a retaining section engaging an exterior of one of the posts and holding the spring on the post during assembly of the starter pawls and springs to the rotor.

In accordance with another embodiment of the present invention, in a rotor assembly having a rotor, starter pawls and springs biasing the starter pawls at first positions, the improvement comprises each of the springs having a coil section and a transverse section, the transverse section extending across a center channel of the coiled section and biasing the spring against a post of the rotor located inside the center channel to thereby hold the spring on the post during assembly of the rotor assembly.

In accordance with another embodiment of the present invention, in a rotor assembly having a rotor, starter pawls and springs biasing the starter pawls at first positions, the improvement comprises means for holding the springs on the posts of the rotor during assembly of the rotor assembly. The means for holding includes the springs each having a center channel with a transverse section extending, at least partially, thereacross.

BRIEF DESCRIPTION OF THE DRAWINGS

The foregoing aspects and other features of the invention are explained in the following description, taken in connection with the accompanying drawings, wherein:

FIG. 8A is a diagrammatic elevational side view of the apparatus shown in FIG. 3.

FIG. 11 is a schematic block diagram of the connection of the computer controller of the assembly machine shown in FIG. 3.

DETAILED DESCRIPTION OF THE INVENTION

Figures 1, 2:
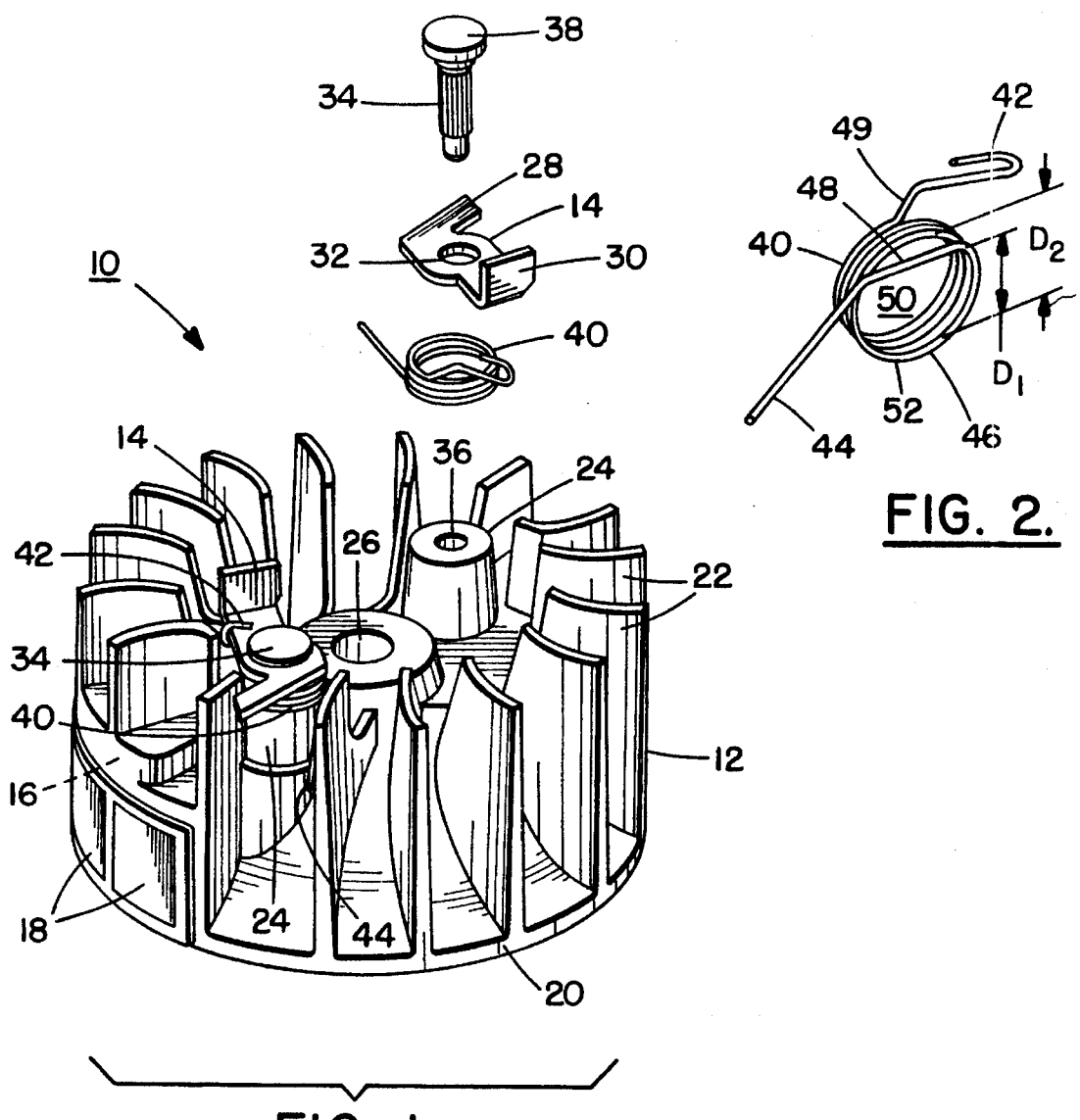
FIG. 1 is a perspective view with a partial exploded section of a rotor assembly incorporating features of the present invention.
FIG. 2 is a perspective view of a spring used in the rotor assembly shown in FIG. 1.
Figure 3:
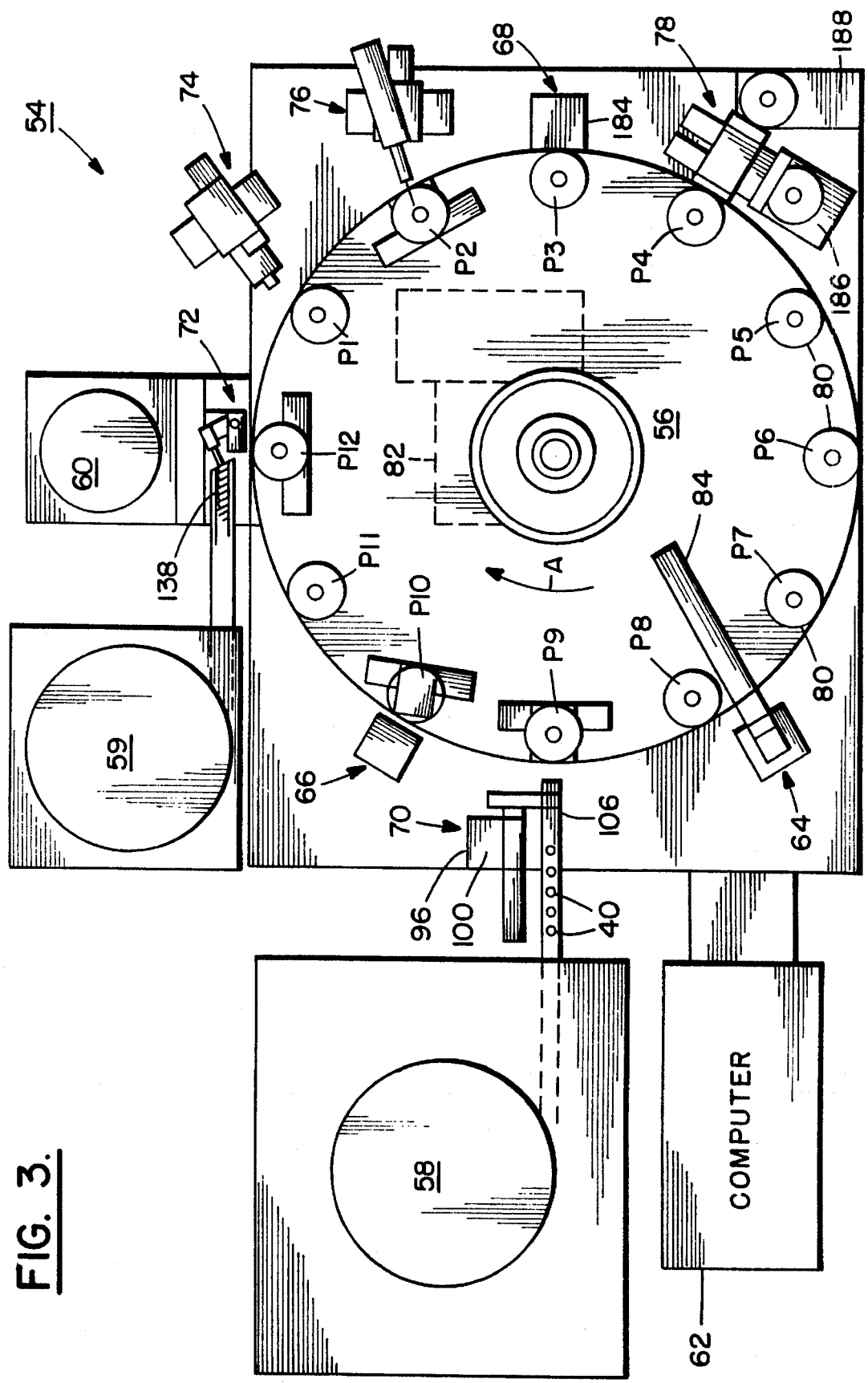
FIG. 3 is a diagrammatical plan top view of an apparatus incorporating features of the present invention.

Referring to FIG. 1, there is shown a partially exploded perspective view of a flywheel rotor assembly 10 that is assembled by the assembly machine 54 shown in FIG. 3. It should be understood, however, that the machine 54 could be used to assemble other types of flywheel rotor assemblies.

The assembly 10 could also be assembled by hand or by another type of machine incorporating at least some of the features of the machine 54. The assembly 10 generally comprises a rotor 12 and spring biased starter pawls 14. The rotor 12 generally comprises a permanent magnet 16, pole shoes 18, and a rotor base 20. In the embodiment shown, the rotor base 20 is made from cast nonferromagnetic metal, such as aluminum. The rotor base 20 is cast over the permanent magnet 16 and portions of the pole shoes 18 to form a unitary member. The rotor base 20 includes cooling fins 22, posts or bosses 24, and a center tapered aperture 26 that includes a key slot (not shown). In alternate embodiments, a rotor assembly such as disclosed in U.S. Pat. No. 4,980,592 could be provided with a modified construction to have starter pawls connected thereto. U.S. Pat. No. 4,980,592 is hereby incorporated by reference in its entirety. In other alternate embodiments, any suitable type of rotor having means for mounting starter pawls could be used.

The starter pawls 14 are identical to each other, are preferably made of metal, and generally comprise a first end 28, a second end 30, and a mounting hole 32. The starter pawls 14 are each movably mounted on a top surface of one of the posts 24 by use of pins 34. The pins 34 are passed into hole 32 and press fitted or interference fitted into holes 36 in the posts 24. The pins 34 have tops 38 that are larger than the holes 32 to thereby retain the starter pawls 14 on their respective posts 24. The first end 28 of each starter pawl 14 is located between two of the cooling fins 22. The second end 30 of each starter pawl 14 is larger and heavier than the first end 28 to facilitate rotational movement of the starter pawl by centrifugal forces when the rotor is spun at a suitable speed, as is generally known in the art. The second ends 30 are generally adapted to contact a starter mechanism (not shown) located therebetween when the rotor is stationary. The starter mechanism is adapted to use the starter pawls to rotate the flywheel rotor assembly 10 and engine shaft (not shown) that the assembly 10 is mounted on to thereby start the engine it is being used on.

Referring also to FIG. 2, the springs 40 are used to bias the starter pawls 14 at a first or home position for being engaged by the starter mechanism, but are adapted to resiliently deform to allow the starter pawls 14 to move out of the path of the starter mechanism once the assembly 10 starts to rotationally spin at a suitable speed. The springs 40 are preferably made of metal, are identical to each other, and comprise a first end 42, a second end 44, a middle coiled section 46, and a straight transverse section 48. The middle coiled section 46 forms a center channel 50. The springs 40 are mounted on the rotor 12 with the posts 24 located in the center channels 50. The second ends 44 are each located between two of the cooling fins 22. The transverse section 48 extends across a portion of the center channel 50, prior to mounting on the posts 24, to provide a distance $D_1$ between the transverse section 48 and the opposite side 52 of the middle coiled section 46 that is less than the width of the posts 24. The inner diameter $D_2$ of the middle coiled section 46, on the other hand, is slightly larger than the width of the posts 24. When the springs 40 are mounted onto the posts 24, the springs 40 are slightly deformed with the transverse section 48 and the opposite side 52 of the middle coiled section clamping the posts 24 therebetween to thereby frictionally hold the springs 40 on their respective posts 24 during the assembly process of the flywheel rotor assembly 10. The first ends 42 have a hook shape that enable the first ends to be operably engaged onto the starter pawls 14 to bias the starter pawls 14 at their home positions. The second ends 44 extend at an angle directly from an end of the transverse sections 48. An offset 49 is provided between the coiled section 46 and the first end 42. In alternate embodiments, other types and shapes of springs, starter pawls, retention pins, and rotors could be used.

The flywheel rotor assembly 10 can be used with any suitable type of internal combustion engine, such as in a chain saw, hedge trimmer, string trimmer, etc. They can be used with both pull-cord type starter mechanisms or electric type starter mechanisms. Although the springs 40 are described as being frictionally retained on the posts 24 between the transverse section 48 and side 52, other alternate embodiments could include transverse section 48 projecting into a recess in the side of the posts 24, or other suitable means to retainingly connect the springs 40 to the rotor bases 20 could be used.

Referring now also to FIG. 3, an assembly machine or apparatus 54 for assembling the rotor assembly 10 is shown. Although the present invention will be described with reference to the single embodiment shown in the drawings, it should be understood that features of the present invention may be embodied in many different forms of alternate embodiment and, that methods of the present invention may be used in many different forms of assembly machines. In addition, any suitable size, shape or type of elements or materials could be used.

The assembly machine 54 generally comprises a rotating table 56, three feeder/hoppers 58, 59, 60, a computer controller 62, three testers 64, 66, 68, four loaders 70, 72, 74, 76, and an unloader 78. As diagrammatically illustrated in FIG. 11, the computer controller 62 is operably connected to the feeder/hoppers, testers, loaders, unloader, stepping motor, rotators, and a control panel 83. In alternate embodiments, other types of control could be used other than a single computer controller. The table 56 is round and has twelve rotor seats 80 located on its top side about its perimeter. The table 56 functions as an assembly line for assembly of the spring biased starter pawls 14 onto the rotors 12. In an alternate embodiment, the circular path assembly line could be replaced with any suitable type of assembly line, such as a straight path assembly line. For purposes of description only, the twelve locations symbolized by the twelve rotor seats 80 in FIG. 3 will be described with reference to clock positions, such as one o'clock position P1, two o'clock position P2, etc. It should be understood, however, that these are only reference names and that the present invention could have more or less than twelve positions located at any suitable orientation relative to each other.

Figure 8B:
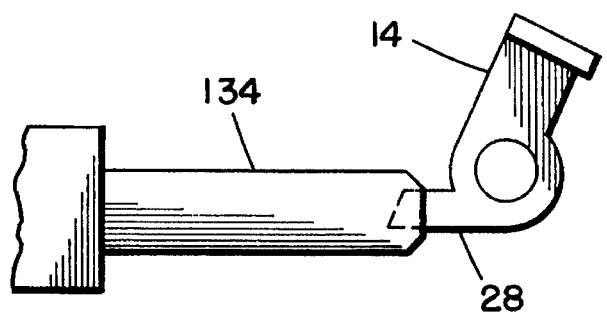
FIG. 8B is a partial plan top view of fingers of a loader located at the 12 o'clock position of the table shown in FIG. 3 grasping a starter pawl.
Figure 8C:
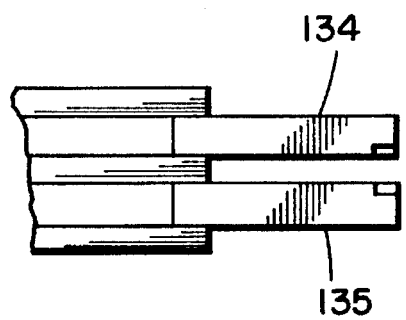
FIG. 8C is a side view of the fingers shown in FIG. 8B.

A stepping motor 82 is located under the center of the table (see FIG. 8A) that is adapted to stepwise rotate the table 56 in a clockwise direction as indicated by arrow A in FIG. 3. As illustrated in FIG. 11, the motor 82 is connected to and controlled by the computer 62. An operator of the assembly machine 54 would generally be located in front of the six o'clock position P6 for loading rotors 12 onto the rotor seats 80 as they stepwise progress to and through the six o'clock position P6. No operations are performed by the machine 54 at the 5 o'clock P5, the 6 o'clock P6, and the 7 o'clock P7 positions to allow the operator plenty of time to load rotors 12 onto the rotor seats 80 at these positions. The underside of the rotor 12 and the top surface of the seats 80 are suitably matingly configured to allow the rotors to be properly positioned on the seats 80 in a flat orientation. The seats 80 each have a shaft (not shown) that is located in the center aperture 26 of the rotor 12 and has a key section that fits in the keyway of the aperture 26 such that the rotor can only be orientated in one orientation on the seat 80. In alternate embodiments, any suitable means to stably orientate the rotors 12 on the seats 80 could be used.

Figure 4:
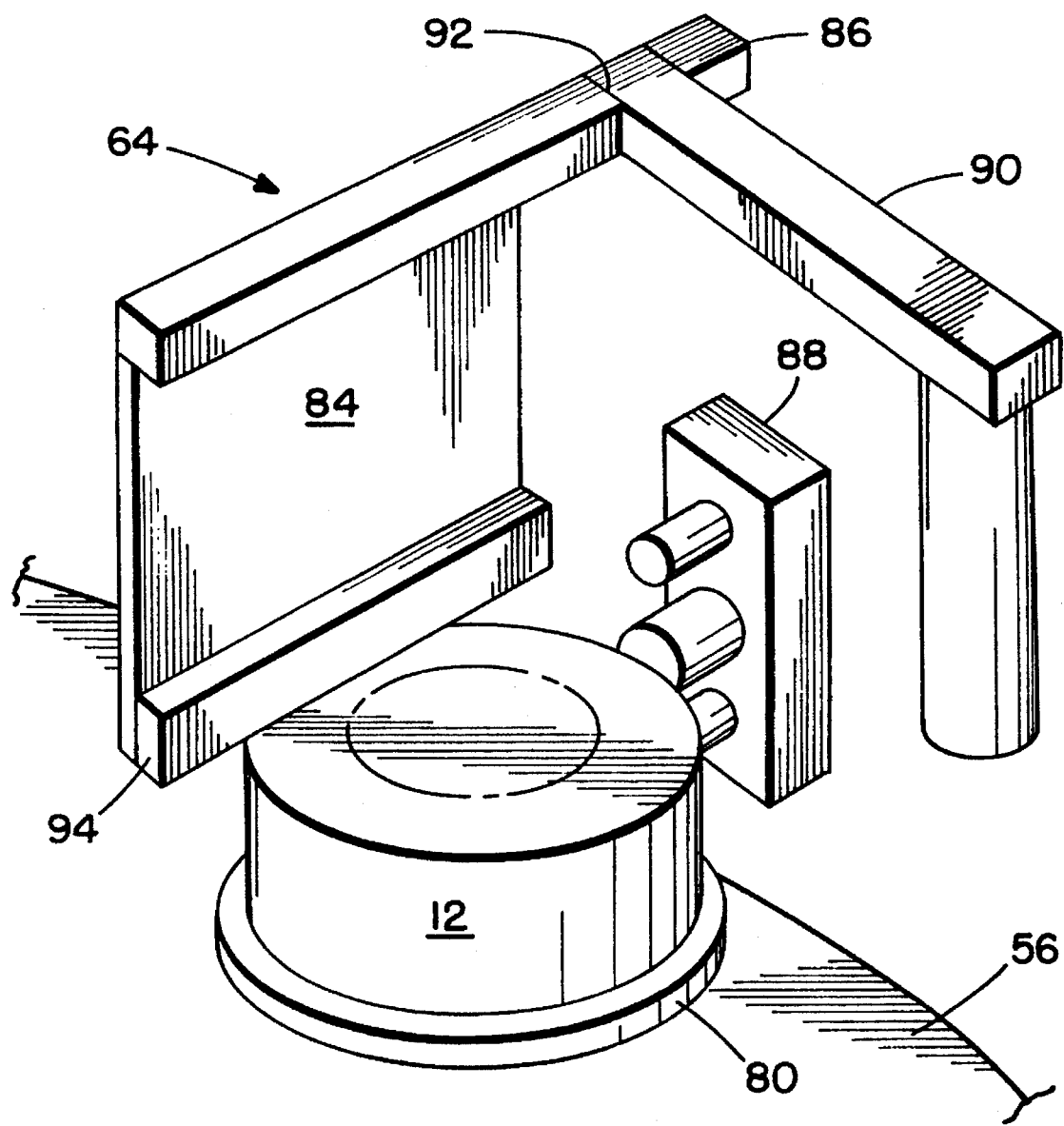
FIG. 4 is a schematic perspective view of a first testing station at the 8 o'clock position of the table shown in FIG. 3.

As the table 56 is rotated, the rotors 12 proceed from being loaded proximate the 6 o'clock position P6, through the seven o'clock position P7, to the 8 o'clock position P8. Referring also to FIG. 4, the 8 o'clock position is provided as a testing station to insure that a rotor is on its seat 80 and that it is properly positioned on the seat. The first testing station 64 generally comprises a height gate 84 with a first sensor 86, and a second sensor 88. The height gate 84 is pivotably connected to the frame 90 of the first tester 64 at area 92. The bottom 94 of the height gate 84 is suitably orientated relative to the table 56 such that if a rotor 12 is not properly seated on a seat 80 as the seat passes the gate 84, the top of the rotor 12 will contact the bottom 94 of the gate 84 and cause it to pivot out of the path of the rotor. The first sensor 86 senses the pivotal movement of the gate 84 and sends a signal to the computer 62 that the rotor 12 is not properly positioned on its seat 80. Based upon this information, as the table 56 is further stepwise advanced, the computer 62 instructs the testers 66, 68 and loaders 70, 72, 74, 76 not to perform operations on the improperly seated rotor when it comes up to them. The second sensor 88 is a proximity sensor that is adapted to sense the proximity of metal next to it and send a signal to the computer 62 based upon its measurements. It senses whether or not a rotor 12 is located on the seat 80 as the seat 80 moves to the 8 o'clock position P8. If a rotor is not sensed by the sensor 88, the sensor 88 signals the computer 62 of the absence of a rotor. If such a signal is sent, the computer instructs the testers 66, 68 and loaders 70, 72, 74, 76 not to perform operations on the empty seat as it rotates around the table. In alternate embodiments, other types of sensors could be used or, any suitably type of first testing station could be provided.

Figure 5A:
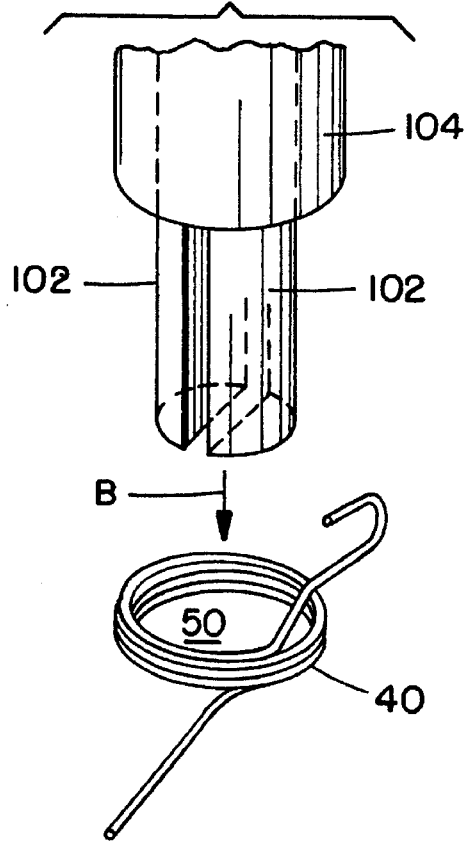
FIG. 5A is a partial perspective view of the loader at the 9 o'clock position of the table shown in FIG. 3 at a pick up position for grasping the coil spring.
Figure 5B:
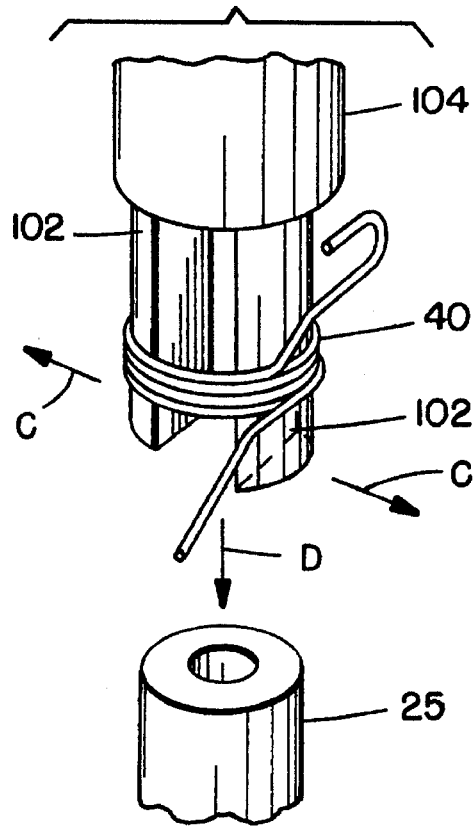
FIG. 5B is a partial perspective view of the loader as shown in FIG. 5A grasping the spring and having moved the spring into position over a post of the rotor.
Figure 5C:
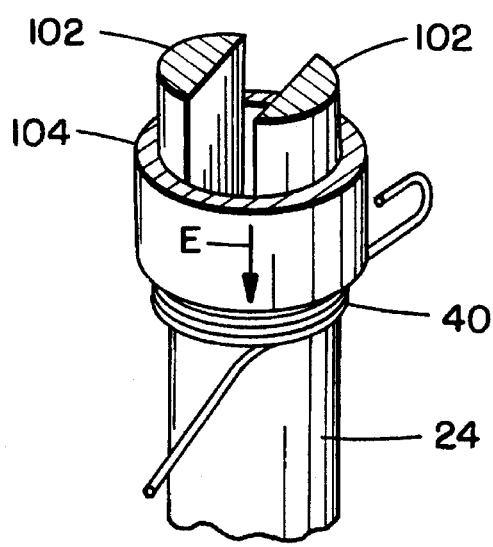
FIG. 5C is a partial perspective view of the loader as shown in FIGS. 5A and 5B having moved the coil spring off of the loader and onto the post of the rotor.
Figure 6A:
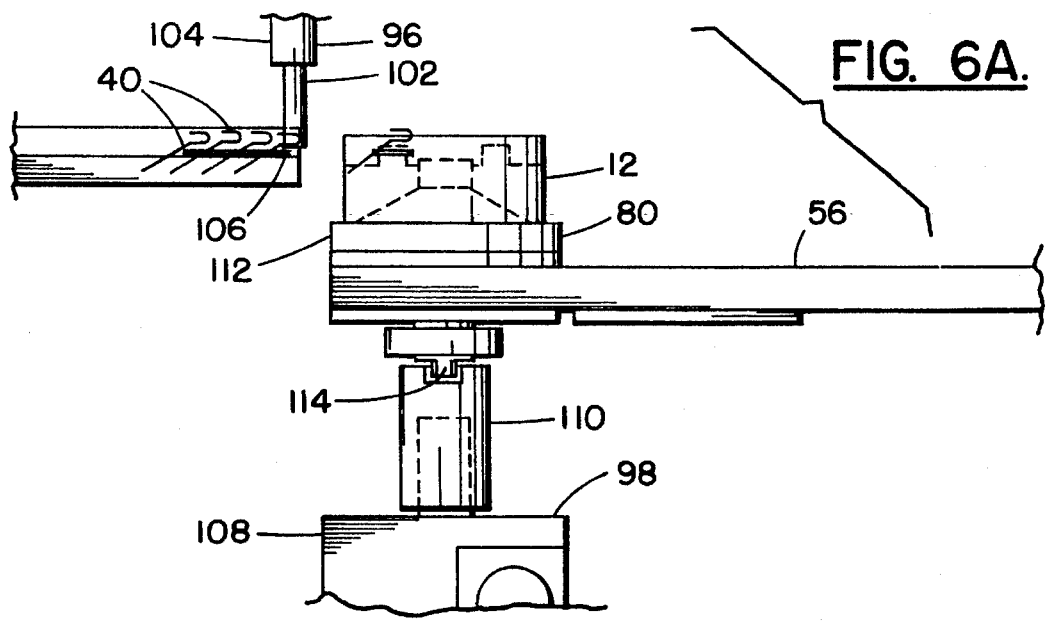
FIG. 6A is a schematic front view of the table and loader at the 9 o'clock position shown in FIG. 3.
Figure 6B:
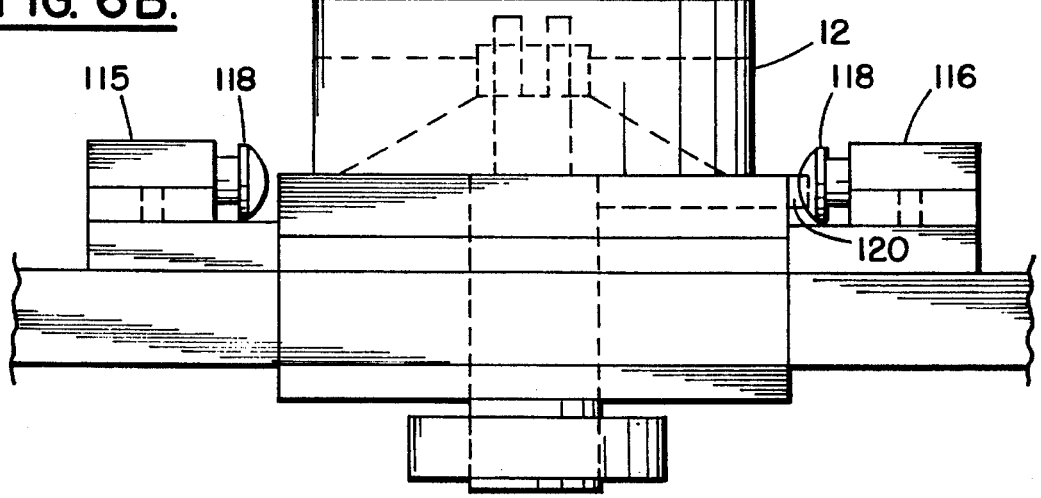
FIG. 6B is a elevational side view of the rotor located on the rotor seat on the table.
Figure 6C:
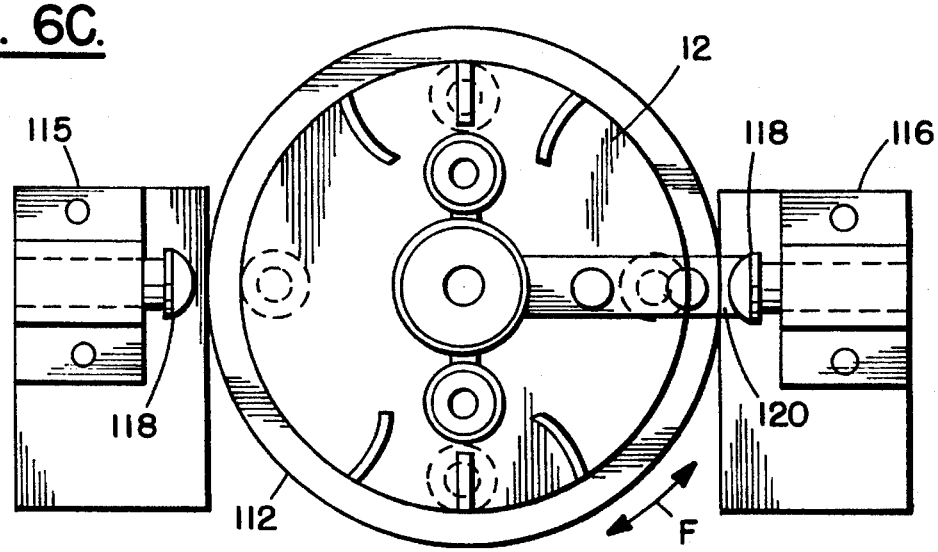
FIG. 6C is a plan top view of the rotor and rotor seat as shown in FIG. 6B.

After the first testing station 64, the table 56 is stepwise rotated to move the rotor 12 to the 9 o'clock position P9. The first loader 70 is located at the 9 o'clock position P9 and is adapted to load the springs 40 onto the posts 24 of the rotor 12. Referring also to FIGS. 5A–6D, the first loader 70 comprises a first positioner 96 and a first seat rotator 98. The first positioner 96 comprises a robotic arm having a computer controlled drive system 100, grasping fingers 102, and a push collar 104. The spring feeder/hopper 58 feeds the springs 40 to a spring pick-up position 106. The first positioner 96 is adapted to grasp a spring 40 at the pick-up position 106. Referring particularly to FIGS. 5A and 6A, the drive system 100 locates the fingers 102 over the leading spring at the pick-up position 106, lowers the fingers 102 into the center channel 50 of the spring 40 as illustrated by arrow B, and then moves the fingers 102 outward from each other as illustrated by arrows C in FIG. 5B. This outward movement of the fingers 102 while inside the center channel 50 causes the spring to be resiliently deformed outward and thereby friction hold the coiled section of the spring on the fingers 102. The drive system 100 then moves the fingers 102 with grasped spring over one of the posts 24 of the rotor 12 as illustrated by FIG. 5B. The drive system 100 then lowers the fingers 102 onto the top surface of the post 24 as illustrated by arrow D. Once on top of the post 24, the fingers 102 are stopped, but the push collar 104 is then lowered as illustrated by arrow E in FIG. 5C. The push collar 104 contacts the spring 40 as it moves down over the fingers 102 and pushes the spring 40 off of the ends of the fingers 102 and onto the post 24. As the spring 40 is pushed off of the ends of the fingers 102, it is able to spring back towards its original shape, at least partially. However, the spring 40 is slightly deformed with the transverse section 48 and the opposite side section 52 of the middle coiled section (see FIGS. 1 and 2) clamping the post 24 therebetween as described above. The first positioner 96 is then moved back to the spring pickup position 106 to get a second spring for the second post on the rotor as seen in FIG. 6A. In an alternate embodiment, the push collar 104 may be comprised of two members located on opposite sides of the fingers 102.

Figure 6D:
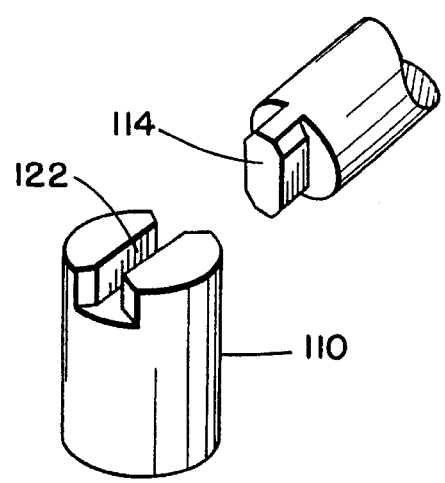
FIG. 6D is an exploded perspective view of a bottom end of the rotor seat shown in FIGS. 6A through 6C and a top end of a rotor seat rotator shown in FIG. 6A.

Referring particularly to FIGS. 6A–6D, in the embodiment shown, the rotator 98 is used to rotate the seat 80 at the 9 o'clock position P9 180°. The rotator 98 includes a computer controlled motor 108 and a drive shaft 110. The seats 80 are all rotatably mounted on the table 56. Each seat 80 has a top section 112, a bottom key 114, and two spring loaded locators 115, 116. The two locators 115, 116 are stationarily mounted on the table 56 except for their spring loaded plungers 118. The top section 112 has a locator plate 120 that is adapted to mate with the front ends of the plungers 118. As the seats 80 rotate, as illustrated by arrow F in FIG. 6C, the locator plate 120 comes into and out of mating alignment with the plungers 118 of the locators 115, 116. The interaction between the locators 115, 116 and locator plate 120 makes certain that the posts 24 are at predetermined angular positions after the seats are rotated. As seen in FIG. 6D, the drive shaft 110 is provided with a key slot 122 that is adapted to receive the bottom key 114 when the table 56 is turned. After the first spring is mounted on the first rotor post as illustrated in FIG. 6A, the rotator 98 rotates the seat 180°. The first positioner 96 then positions a second spring on the second post of the rotor. This completes loading of the two springs 40 onto the two posts 24 by the first loader 70. In an alternate embodiment, the first rotator 98 need not be provided if the first positioner 96 is adapted to load the two springs onto the two posts without rotating the rotor 12. In an alternate embodiment, another type of first positioner could also be used.

Figure 7:
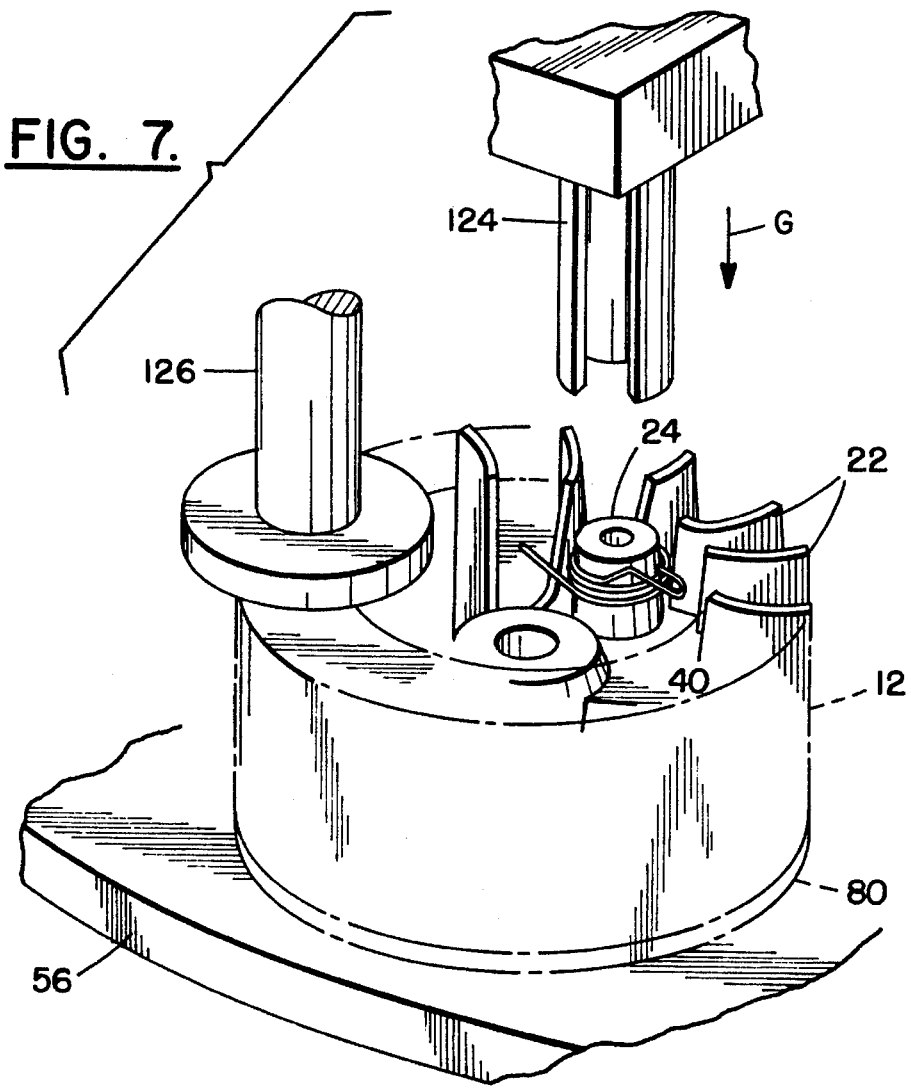
FIG. 7 is a diagrammatical perspective view of the testing station located at the 10 o'clock position of the table shown in FIG. 3.

After mounting of the two springs 40 onto the rotor 12, the table 56 is stepwise advanced to move the rotor 12 with its two attached springs 40 to the 10 o'clock position P10. The second tester 66 is located at the 10 o'clock position P10 as seen in FIG. 7. The second tester 66 has a testing probe 124 and a clamp 126. The second tester 66 is generally designed to test whether or not the two springs 40 have been properly positioned on the two posts 24. The clamp 126 first comes down contacting the top of some of the cooling fins 22 to firmly hold the rotor 12 against its seat 80. Then the probe 124 comes down over the second post 24 as shown by arrow G in FIG. 7. If the second spring 40 is properly present, the probe 124 will contact the spring 40, pressing or sandwiching the spring 40 against the rotor 12, and be stopped at a first predetermined distance or depth. If the spring 40 is not properly present, the probe 124 will advance past the first predetermined depth. The probe 124 will send a signal to the computer 62 based upon this test. The probe 124 and clamp 126 are then lifted. A second rotator (not shown) located under the table 56 at the 10 o'clock position P10 the rotates the rotor 12 180°. The second rotator is substantially identical to the first rotator 98. The clamp 126 and probe 124 are lowered once again to test the positioning of the first spring on the first post of the rotor. The clamp and probe are then both lifted and the rotor 12 is allowed to advance to the 11 o'clock position as the table 56 is stepwise rotated. In the event that the second tester 66 senses that either of the first or second springs is not present on the posts 24, or is otherwise improperly loaded on their posts, the computer instructs the remaining tester 68 and loaders 72–78 not to perform their operations on that rotor. In an alternate embodiment, other types of spring loading testers could be used.

In the embodiment shown, the 11 o'clock position P11 is an idle position in which no testing or loading takes place. However, in alternate embodiments, the 11 o'clock position could be eliminated or, contain one of the testers or loaders.

Figure 8D:
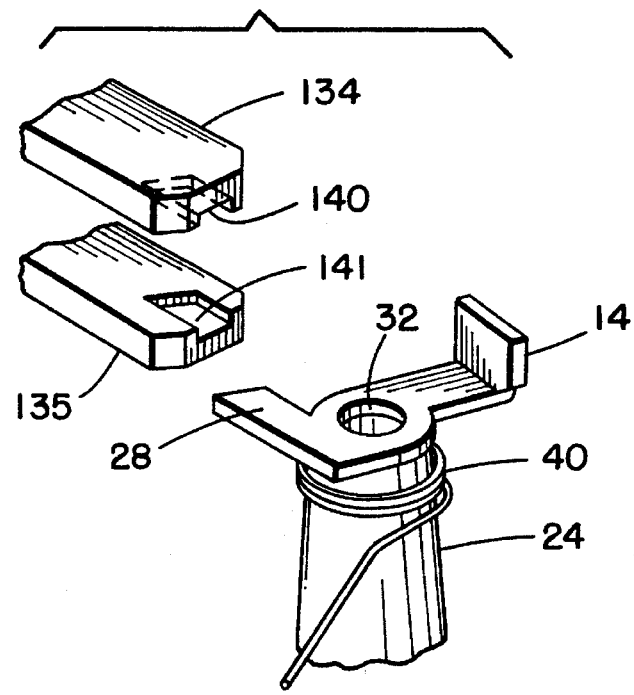
FIG. 8D is a diagrammatic perspective view of the fingers shown in FIGS. 8B and 8C that position the starter pawl over the top of the rotor post.
Figure 8E:
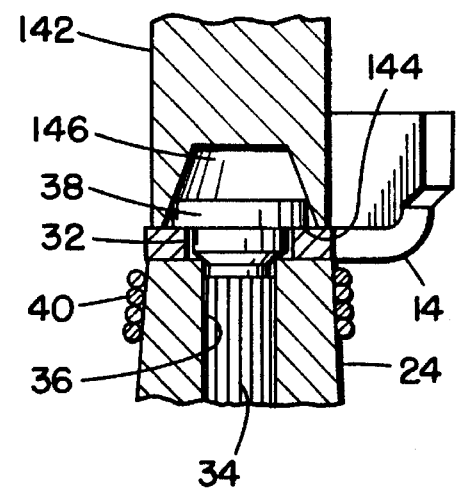
FIG. 8E is a schematic sectional view of the top of the post shown in FIG. 8D and starter pawl with a pin being attached by a positioner of the loader at the 12 o'clock position.

Referring to FIGS. 1, 3 and 8A–8E, the second loader 72 is located at the 12 o'clock position P12 and generally comprises a second positioner 128, a third positioner 130, and a third rotator 132. The third rotator 132 is substantially identical to the first rotator 98. The second positioner 128 generally comprises camping fingers 134, 135 connected to a computer controlled drive system 136. The starter pawls 14 are fed from the second feeder/hopper 59 to a starter pawl pick-up area 138. The computer controlled drive system 136 causes the fingers 134, 135 to clamp the end of the first end 28 of a starter pawl therebetween at the pick-up area 138. The ends of the fingers 134, 135 has shaped areas 140, 141 that matingly receive the first end 28 of the starter pawl 14 at the pick-up area 138. In an alternate embodiment, the starter pawls 14 could have a keying projection and the shaped areas 140, 141 could have a mating keying recess to precisely locate and hold a pawl in the fingers until released. After clamping of the first end 28 by the fingers 134, 135, the computer controlled drive system 136 moves the fingers 134, 135 to move the clamped starter pawl into position over one of the posts 24 as illustrated in FIG. 8D. The hole 32 of the starter pawl is aligned over the hole 36 of the post 24. The pin 34 is then connected to the post 24 by the third positioner 130.

The third positioner 130 generally comprises a pin holder 140 and a plunger 142. Pins 34 are fed from the third feeder/hopper 60 to the pin holder 140. The plunger 142 is actuated to drive the pin held in the pin holder 140 into the hole 32 and the hole 36. The front end of the plunger 142 has a front face 144 for contacting a top surface of the starter pawl 14 over the post 24 to press the starter pawl against the top surface of the post 24, and a recessed area 146 in the front face for contacting and pushing on the top 38 of the retention pin 34. This type of plunger is used such that the retention pin 34 can be connected to the post 24 at a predetermined location relative to the top of the starter pawl. A slight gap is provided between the bottom of the top 38 and the top surface of the starter pawl 14 such that the starter pawl 14, although retained to the post 24 by the pin 34, is nonetheless still able to movably rotate about the pin 34. The pin 34 makes an interference fit with the post 24 to thereby fixedly, but movably retain the starter pawl 14 on the post 24. In alternate embodiments, other types of second and third positioners could be used to connect the starter pawl and pin to the post.

After connection of the first starter pawl and first retention pin to the first post, the second and third positioners are moved away from the rotor 12. The third rotator 132 then rotates the rotor 12 180°. The second and third positioners 128, 130 are then used to connect a second starter pawl and second retention pin to the second post of the rotor 12. The computer 62 then uses the motor 82 to stepwise advance the table 56. The rotor 12 with two springs 40, the two starter pawls 14, and the two attached retention pins 34 is advance to the 1 o'clock position P1.

Figure 9A:
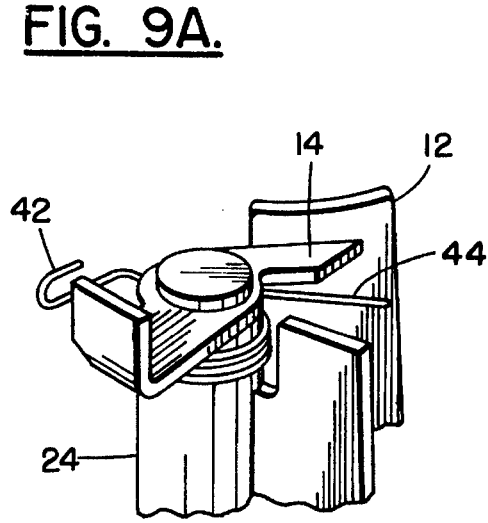
FIG. 9A is a partial perspective view showing the position of the spring and starter pawl after connection of the pin to the rotor post.

Referring to FIGS. 3 and 9A–9F, the third loader 74 is located at the 1 o'clock position P1 and generally comprises an elongate member 148, a fourth positioner 150, a rotating brush 152, and a leaf spring 154. FIG. 9A shows a portion of the rotor 12 as it moves from the 12 o'clock position P12 to the 1 o'clock position P1. As can be seen with the comparison to FIG. 1, the first end 42 of the spring 40 is not yet connected to the starter pawl 14. It is the purpose of the third loader 74 and fourth loader 76 to operably connect the first ends 42 of the two springs 40 to their respective starter pawls 14.

Figure 9B:
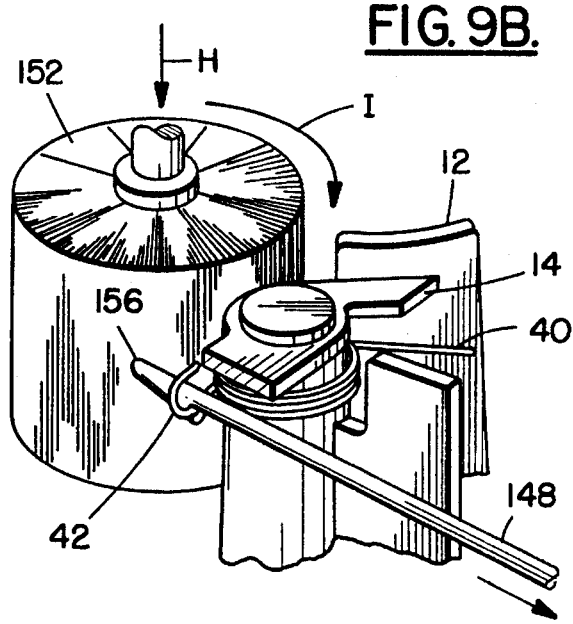
FIG. 9B is a partial perspective view of the rotor as shown in FIG. 9A at the 1 o'clock position of the table shown in FIG. 3.
Figure 9C:
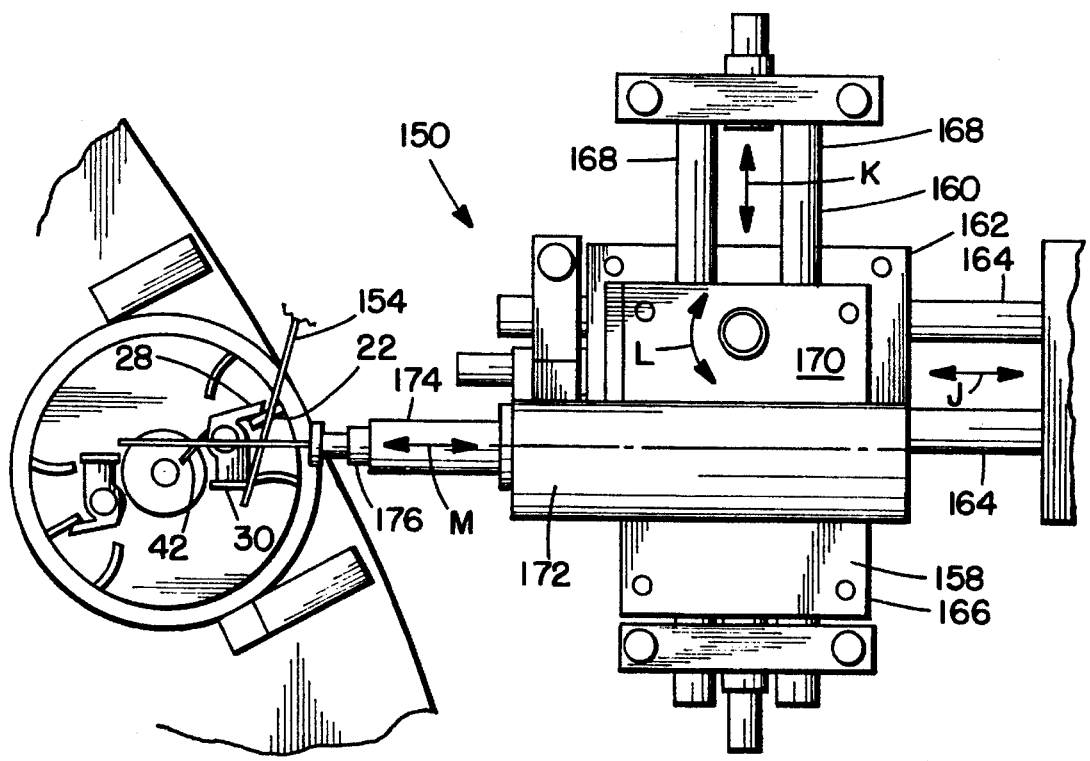
FIGS. 9C, 9D, and 9E are schematic plan top views of the loader at the 1 o'clock position.

As the rotor 12 moves to the 1 o'clock position, the leaf spring 154 is contacted by the second end 30 of the starter pawl 14 as shown in FIG. 9C. The leaf spring 154 biases the starter pawl 14 such that its first end 28 contacts one of the cooling fins 22 and holds the starter pawl in place. Once the rotor 12 is in the 1 o'clock position P1, the rotating brush 152 is lowered, as indicated by arrow H in FIG. 9B, next to the post 24 and rotates as indicated by arrow I. The brush 152 causes the first end 42 of the spring 40 to be located at a suitable hooking position for grasping by the elongate member 148. A holder (not shown), similar to the clamp 126 at the 10 o'clock position P10, holds the rotor 12 against its seat 80.

The elongate member 148 merely comprises a quill-like rod with a hook 156 at its distal end. The proximal end of the elongate member 148 is connected to the fourth positioner 150. In the embodiment shown, as best seen in FIG. 9C, the fourth positioner 150 generally comprises a mover system 158 movably mounted on a track system 160. The system mover 158 includes a first mover 162 movably mounted on first track rails 164, a second mover 166 movably mounted on second track rails 168 (the second track rails 168 being fixedly connected to the first mover 162), a third mover 170 movably mounted on the second mover 166, and a fourth mover 172 mounted on the third mover 170. In the embodiment shown, all four movers 162, 166, 170, 172 are connected to the computer 62 and include electrically controlled motors to drive the movers. In alternate embodiments, any suitable type of driver could be used including computer controlled pneumatic movers. The first mover 162 is able to move on the first track rails 164 as indicated by arrow J. When the first mover 162 moves, it moves the second track rails 168, the second mover 166, the third mover 170 and the fourth mover 172. The second mover 166 is able to move on the second track rails 168 as indicated by arrow K. When the second mover 166 moves, it moves the third mover 170 and the fourth mover 172. The third mover 170 is movably mounted to the second mover as indicated by arrow L and can also move vertically up and down. When the third mover 170 moves, it moves the fourth mover 172. The fourth mover 172 has an axial longitudinally movable plunger 174 and an axially rotational movable plunger 176. The first plunger 174 can extend and retract as indicated by arrow M. The second plunger 176 can axially rotate and has the proximal end of the elongate member 148 connected thereto.

Figure 9D:
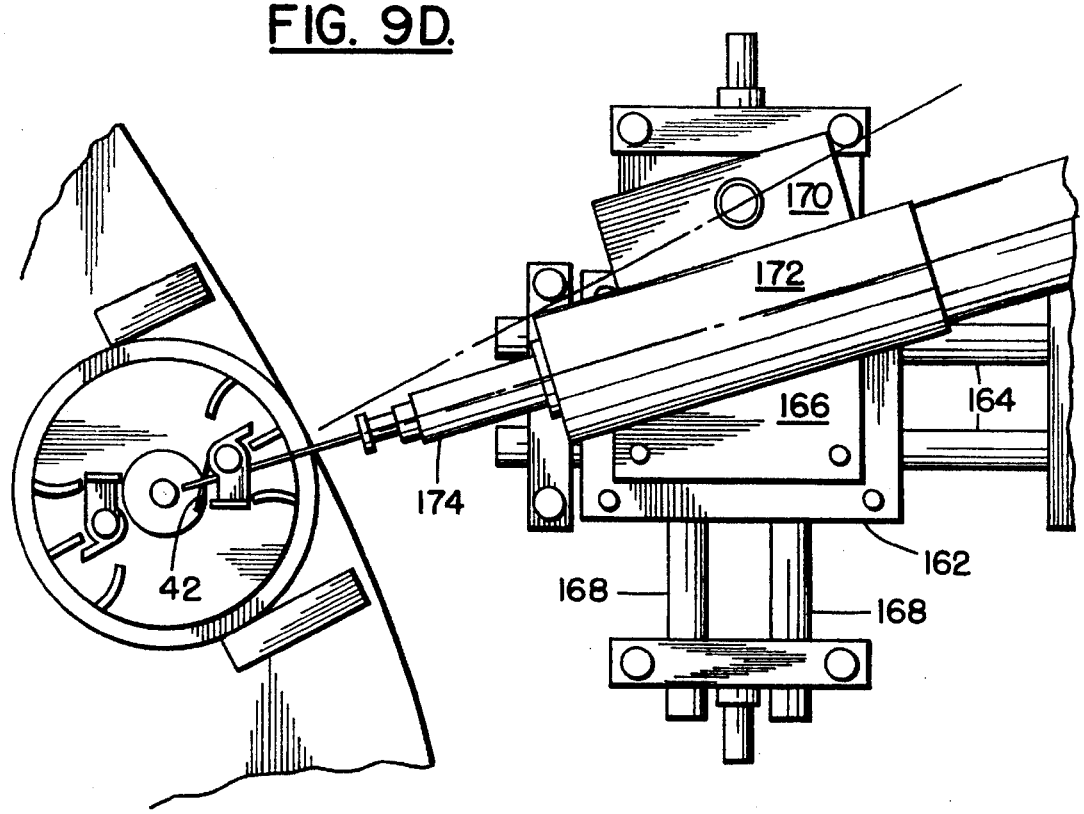
Figure 9E:
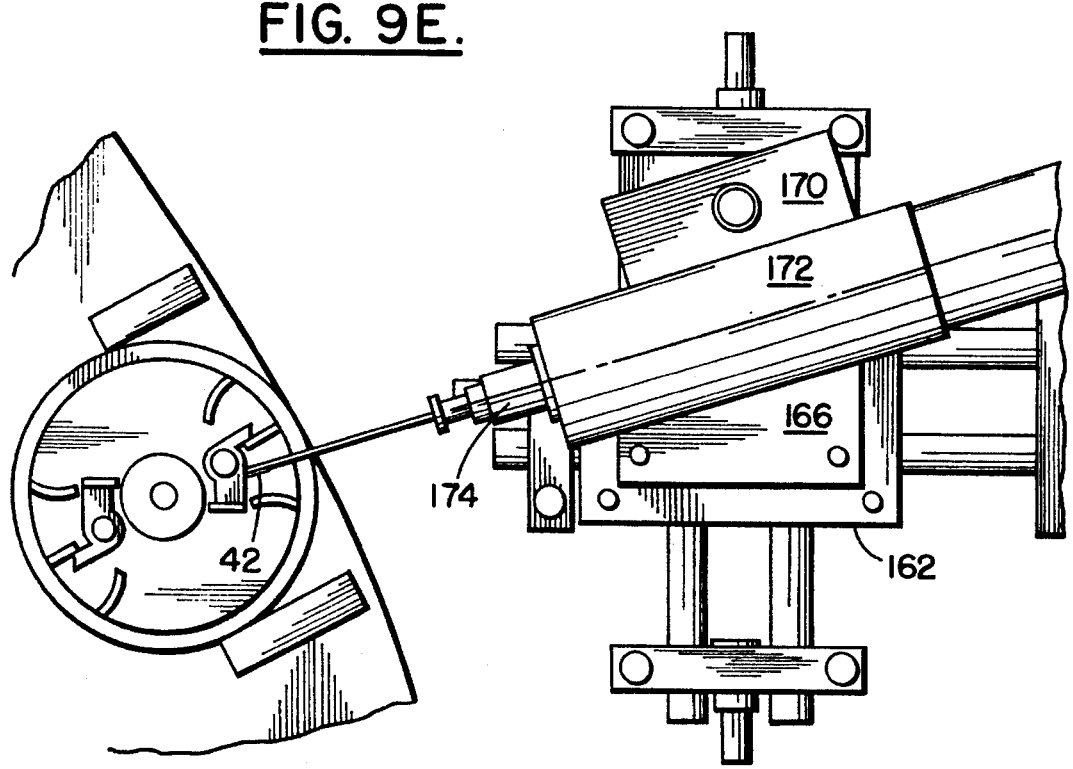
Figure 9F:
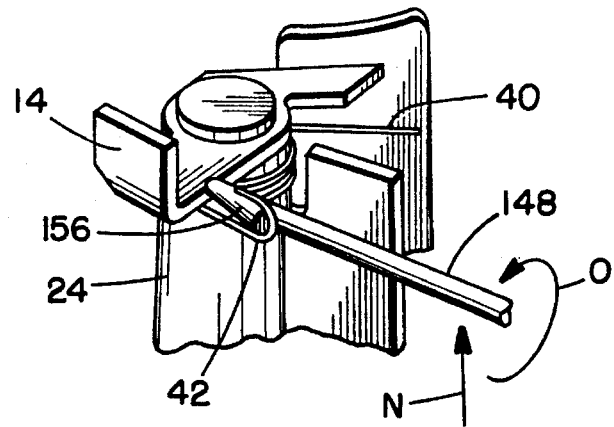
FIG. 9F is a partial perspective view of the rotor at the 1 o'clock position showing a first end of the spring just prior to hooking the first end of the spring onto the starter pawl.

When the rotor 12 advances to the 1 o'clock position, the first mover 162 moves from a retracted position to the hooking position shown in FIG. 9C. The fourth mover 172 extends its first plunger 174 and the second plunger has the hook 156 in a downward hooking position. As the elongate member is extended it passes into the hooked or curved end of the first end 42 of the spring 40 as shown in FIG. 9B. The second and third movers 166, 170 are then moved as illustrated in FIG. 9D. Then, the first plunger 174 is retracted as illustrated in FIG. 9E. This pulls the first end 42 of the spring 40 with the hook 156 underneath the starter pawl 14. Finally, the third mover 170 moves the fourth mover 172 vertically upward as illustrated by arrow N in FIG. 9F and the fourth mover 172 axially rotates the elongate member 148 as illustrated by arrow O. This causes the first end 42 of the spring 40 to disengage from the hook 156 and spring back to latch onto the starter pawl 14 (see in FIG. 1). The fourth positioner 150 is then retracted back to its retracted starting position, the brush 152 is moved upward, and the table 56 is rotated to move the rotor 12 to the 2 o'clock position P2.

When the rotor 12 reaches the 2 o'clock position P2, a fourth seat rotator (not shown) that is substantially similar to the first rotator 98, rotates the rotor 180°. The fourth loader 76, which is substantially the same as the third loader 74, operably connected the first end of the other spring to the other starter pawl. When the table 56 is rotated again, the rotor 12 is advanced to the 3 o'clock position P3.

Figure 10:
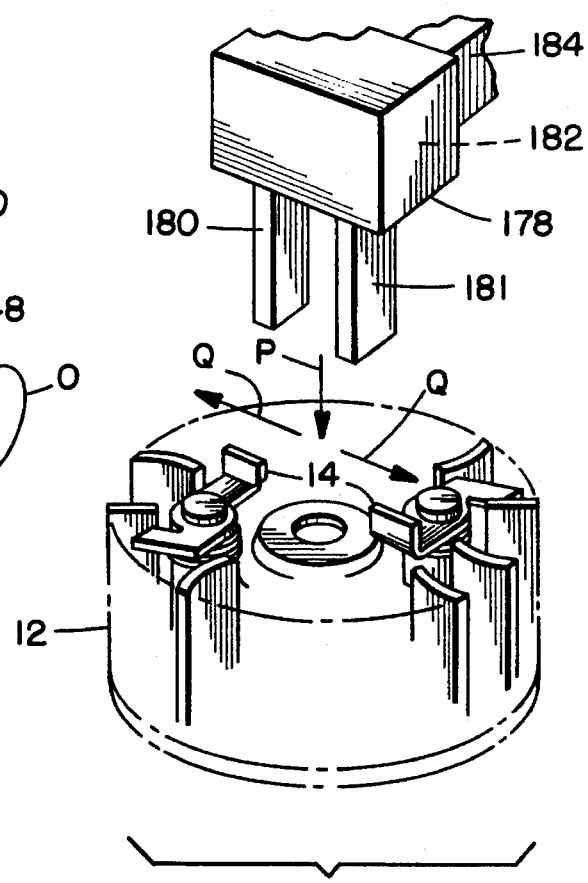
FIG. 10 is a schematic perspective view of the testing station located at the 3 o'clock position of the table shown in FIG. 3.

Referring to FIGS. 3 and 10, the third tester 68 is located at the 3 o'clock position P3. The tester 68 generally comprises a probe 178 having two fingers 180, 181 and a sensor 182 connected to the fingers 180, 181 and, a positioner 184. After the rotor 12 is moved to the 3 o'clock position P3, the positioner 184 moves the fingers 180, 181 downward as illustrated by arrow P into the area between the two starter pawls 14. The fingers 180, 181 are then outwardly expanded relative to each other as illustrated by arrow Q. The fingers 180, 181 contact the second ends 30 of the starter pawls 14 and move them outward. The outward forces exerted by the positioner 184 on the fingers 180, 181 is then terminated. If the springs 40 are properly connected to the starter pawls 14 and rotor 12, the starter pawls 14 will push the finger 180, 181 back towards each other. If the springs 40 are not properly connected, then the fingers 180, 181 will not be pushed back towards each other. The sensor 182 senses whether or not the fingers 180, 181 are pushed back towards each other and sends a signal to the computer to that effect. The positioner 184 then raises the probe 178. Rotation of the table 56 then causes the rotor 12 to move to the 4 o'clock position P4.

The unloader 78 is located at the 4 o'clock position P4. The unloader 78 generally comprises a computer controlled robotic arm that is adapted to pick up the rotor 12 at the 4 o'clock position P4 and deposit it either in a reject area 186 or a completed assembly area 188. The computer 62 will cause the unloader 78 to deposit the rotor in the reject area 186 if any of the testers 64, 66, or 68 sensed a problem while the rotor 12 was being passed along the assembly line. Only if no problems were sensed at all three testers 64, 66, 68 does the computer 62 instruct the unloader to deposit the completed assembly 10 into the completed assembly area 188. In an alternate embodiment, any suitable type of unloader could be used, such as the operator manually removing the assemblies 10 from the table 56. It should be understood that the machine 54 is preferably operated by the operator putting on a new rotor 12 at the 6 o'clock position P6 each time the table 56 makes a stepwise rotation. Therefore, the testers 64, 66, 68 and loaders 70, 72, 74, 76 all operate at the same time on different rotors on the different rotor seats 80. In a preferred embodiment, the stepping motor 82 rotates the table 56 about every 3 to 4 seconds. The operations at each one of the positions on the table are completed within this time frame. Therefore, when the machine is running at full capacity, it is able to unload a completed rotor assembly 10 at the unloader 78 about every 3 to 4 seconds.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A rotor assembly comprising:
   a rotor having a permanent magnet and starter pawl mounting posts;
   starter pawls movably mounted on the posts; and
   springs mounted on the posts biasing the starter pawls in first positions, the springs each having a first end mounted on one of the starter pawls, an opposite second end positioned against a portion of the rotor, and a middle section having a retaining section engaging an exterior of one of the posts and holding the spring on the post during assembly of the starter pawls and springs to the rotor wherein the middle sections includes a coiled section and the retaining section includes a transverse section that extends, at least partially, across a center channel formed by the coiled section.

2. An assembly as in claim 1 wherein the second end of the spring extends at an angle from an end of the transverse section.

3. An assembly as in claim 2 wherein the second end of the spring is biased against a cooling fin of the rotor.

4. An assembly as in claim 1 wherein the first end of the spring has a hook-like shape.

5. An assembly as in claim 4 wherein the springs each have an offset between the first end of the spring and the middle section of the spring.

6. An assembly as in claim 1 wherein the coiled section center channel has a width wider than the post, but the distance between the transverse section and an opposite side of the coiled section is less than the width of the post.

7. In a rotor assembly having a rotor, starter pawls, and springs biasing the starter pawls at first positions, the improvement comprising:
   each of the springs having a coiled section and a transverse section, the transverse section extending across a center channel of the coiled section and biasing the spring against a post of the rotor located inside the center channel to thereby hold the spring on the post during assembly of the rotor assembly.

8. A rotor assembly as in claim 7 wherein the springs each have a first end with a hook-like shape that is connected to one of the starter pawls.

9. A rotor assembly as in claim 8 wherein the springs each have a second end biased against a cooling fin of the rotor.

10. A rotor assembly as in claim 7 wherein the center channel of the coiled section has a width that is wider than a width of the post, but the distance between the transverse section and an opposite side of the coiled section is less than the width of the post.

11. A rotor assembly as in claim 7 wherein the transverse section is straight.

12. A rotor assembly as in claim 9 wherein the second end of the spring extends at an angle directly from an end of the transverse section.

13. In a rotor assembly having a rotor, starter pawls, and springs biasing the starter pawls at first positions, the improvement comprising:
   means for holding the springs on posts of the rotor during assembly of the rotor assembly, the means for holding including the springs each having a center channel with a transverse section extending, at least partially, thereacross.

14. A rotor assembly as in claim 13 wherein the springs have coiled sections that form the center channel.

* * * * *